United States Patent
Peng et al.

(10) Patent No.: US 8,402,167 B2
(45) Date of Patent: Mar. 19, 2013

(54) METHOD AND DEVICE FOR INVOKING USI

(75) Inventors: Chenghui Peng, Shenzhen (CN); Bojie Li, Shenzhen (CN); Yong Xie, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 175 days.

(21) Appl. No.: 12/849,984

(22) Filed: Aug. 4, 2010

(65) Prior Publication Data

US 2010/0299359 A1 Nov. 25, 2010

Related U.S. Application Data

(63) Continuation of application No. PCT/CN2009/070489, filed on Feb. 20, 2009.

(30) Foreign Application Priority Data

Feb. 27, 2008 (CN) .......................... 2008 1 0101034

(51) Int. Cl.
*G06F 15/16* (2006.01)
(52) U.S. Cl. ........................................ 709/245; 709/200
(58) Field of Classification Search .................. 709/200, 709/245

See application file for complete search history.

(56) References Cited

U.S. PATENT DOCUMENTS

| 6,157,829 | A | 12/2000 | Grube et al. | |
| 7,043,608 | B2 * | 5/2006 | Sun | 711/135 |
| 7,882,217 | B2 * | 2/2011 | Katzir | 709/224 |
| 8,055,699 | B2 * | 11/2011 | Kong et al. | 709/201 |
| 2004/0215668 | A1 * | 10/2004 | Sun | 707/201 |
| 2006/0111081 | A1 | 5/2006 | Whittington et al. | |
| 2008/0285464 | A1 * | 11/2008 | Katzir | 370/241 |
| 2010/0238867 | A1 * | 9/2010 | Li et al. | 370/328 |

FOREIGN PATENT DOCUMENTS

| CN | 1672393 | 9/2005 |
| CN | 1863376 | 11/2006 |
| WO | 2008/154121 | 12/2008 |

OTHER PUBLICATIONS

Written Opinion of International Searching Authority mailed Apr. 16, 2009 issued in corresponding International Patent Application No. PCT/CN2009/070489.
*IEEE Standard 802.16*, IEEE, Oct. 1, 2004, pp. 1-857.
*IEEE Standard 802.16e*, IEEE, Feb. 28, 2006, pp. 1-822.
*Universal Services Interface (USI) An Architecture for Internet+ Service Model NWG Release 1.5*, WiMAX, Jun. 2007, pp. 1-857.
WiMAX Forum Network Architecture (Stage 3: Detailed Protocols and Procedures) Release 1.1.1, WiMAX, Sep. 12, 2007, pp. 1-537.
International Search Report, mailed Apr. 16, 2009, in corresponding International Application PCT/CN2009/070489 (4 pp.).
Patent Examination Report No. 2 issued Aug. 24, 2012 in corresponding Australian Patent Application No. 2009218925 (3 pages).

* cited by examiner

*Primary Examiner* — Brian P Whipple
(74) *Attorney, Agent, or Firm* — Staas & Halsey LLP

(57) ABSTRACT

In the field of communication technology, a method for invoking a Universal Service Interface (USI) and a USI system are provided. The schemes provide a user with a short-lived user ID for the application to interact with the USI system. The short-lived ID has a corresponding relation with the long-lived user ID and can be found according to the long-lived user ID regardless of whether the user is online or offline. The method and device can effectively ensure the security of USI invocation, and ensure that the application can initiate the USI service request even when the user is in an offline state.

14 Claims, 3 Drawing Sheets

METHOD AND DEVICE FOR INVOKING USI

CROSS-REFERENCE TO RELATED APPLICATIONS

The application is a continuation of International Application NO. PCT/CN2009/070489, file on Feb. 20, 2009, which claims priority to Chinese Patent Application No. 200810101034.4, filed on Feb. 27, 2008, both of which are hereby incorporated by reference in their entireties.

FIELD OF THE TECHNOLOGY

The present invention relates to the field of communications technologies, and more particularly to a method and device for invoking a Universal Service Interface (USI).

BACKGROUND OF THE INVENTION

Worldwide Interoperability for Microwave Access (WiMAX) is a wireless metropolitan area network technology based on IEEE 802.16 standards. A WiMAX network is mainly formed by three components, namely, a Mobile Station (MS), an Access Service Network (ASN), and a Connectivity Service Network (CSN), where the ASN includes a base station and an ASN gateway, and the CSN includes entities such as an Authentication, Authorization and Accounting (AAA) server, a message server, and a location server.

A Universal Service Interface (USI) system is an interface that opens service capabilities of a WiMAX network to a third-party application inside or outside the network. By invoking the service capabilities provided by the USI, the third-party application can develop services for WiMAX access users more easily, and can provide personalized services for WiMAX access users more conveniently. Capabilities of the WiMAX network that are developed by using the USI system include application layer paging, positioning, user information query, user authentication, Quality of Service (QoS), and the like.

In the WiMAX network, a user has a unique internal identity, and the internal identity is stored in the AAA server of the CSN. The WiMAX network provides capabilities and services of the WiMAX network based on the internal identity. However, in consideration of security and privacy, the internal identity is not exposed to entities outside the WiMAX network. When an Application Service Provider/internet Application Service Provider (ASP/iASP) (briefly referred to as an application in the present invention) provides services based on WiMAX USI system capability for a specific user, the application must identify an internal identity of the user in the WiMAX network with a USI identity (ID) of the user, so that the WiMAX network can provide services based on the internal identity.

An existing WiMAX protocol defines a format of the USI identity ID. The USI identity ID is formed by two components: a temporary pseudo user identity, and a Fully Qualified Domain Name (FQDN) of a USI system of a Network Service Provider (NSP) of the user. The USI identity ID is assigned to the user when the user is online.

During the development of the present invention, the inventor found that the solution for defining the USI identity ID in the prior art has at least the following defects.

The conventional USI identity ID is temporary, and the USI identity ID changes over time or as the user accesses/exits the network. Therefore, the solution is not applicable to a scenario where the application actively initiates a USI service request. Meanwhile, since the USI identity ID in the solution is assigned only when the user is online, the initiation of a USI service by the application when the user is offline is not supported.

SUMMARY OF THE INVENTION

The present invention is directed to a method and a device for invoking a USI, which can solve the problem in the prior art that the application cannot actively initiate a USI service.

The present invention is achieved through the following technical solution.

In an embodiment, the present invention provides a method for invoking a USI, which includes:

if no valid short-lived user identity (ID) of a target user exists in an application, initiating, by the application, a service request to a USI system using a long-lived user ID of the target user;

receiving, by the application from the USI system, a short-lived user ID corresponding to the long-lived user ID used in the service request;

initiating, by the application, a service request to the USI system using the short-lived user ID.

In an embodiment, the present invention provides a method for invoking a USI, which includes:

in an interaction process with a USI system, if no short-lived user Identity (ID) exists, initiating a service request to the USI system by using a long-lived user ID, and receiving a short-lived user ID sent by the USI system and corresponding to the long-lived user ID used in the service request; and initiating a service request to the USI system by using the short-lived user ID sent by the USI system and corresponding to the long-lived user ID used in the service request.

In an embodiment, the present invention provides a device for generating a short-lived user Identity (ID), which includes:

a first unit, configured to generate a short-lived user ID for a user, and maintain the short-lived user ID;

a second unit, configured to store a binding relation between the short-lived user ID and a long-lived user ID; and a third unit, configured to search in the second unit for a short-lived user ID corresponding to a long-lived user ID after receiving a service request carrying the long-lived user ID.

In an embodiment, the present invention provides an application device, which includes:

a storage unit, configured to store a short-lived user ID, a long-lived user ID, application identity information of a user, and binding relations between them;

a search unit, configured to search in the storage unit for a short-lived user ID of a target user;

a first sending unit, configured to send a service request to a Universal Service Interface (USI) system by using the short-lived user ID of the target user after the search unit finds the short-lived user ID; and a second sending unit, configured to send a service request to the USI system by using a long-lived user ID after the search unit fails to find the short-lived user ID of the user.

It can be seen from the technical solutions according to the embodiments of the present invention that, by using the short-lived user ID and the long-lived user ID in combination, the present invention effectively ensures the security of USI invocation, supports both the initiation of a USI service by a user terminal and the active initiation of a USI service by the application, and ensures that the application can initiate the USI service request even when the user is in an offline state, and thus the problem of limitation on the initiation of a USI service by the application in the prior art is solved.

DETAILED DESCRIPTION OF THE EMBODIMENTS

The technical solution under the present invention is elaborated below with reference to accompanying drawings. Evidently, the embodiments described below are for the exemplary purpose only, without covering all embodiments of the present invention. Person having ordinary skill in the art can derive other embodiments from the embodiments given herein without making any creative effort, and all such embodiments are covered in the protection scope of the present invention.

In the present invention, a long-lived user ID and a short-lived user ID are used in combination when a USI system is invoked. The long-lived user ID may be provided to a user by an NSP when the user subscribes to the NSP (for example, notify the user by providing a Subscriber Identity Module (SIM) card or a digital certificate or through a contract), or be delivered to a user terminal by the NSP when the user accesses the network. The long-lived ID is formed of two components: a user ID unique in the NSP assigned to the user by the NSP, and an ID of the NSP to which the user subscribes. Through the ID of the NSP, an address of the NSP in a USI system can be obtained, and this address may be in the form of a domain address of the NSP. The long-lived user ID is known to the user, or is stored in an identity module of the user terminal device, and meanwhile is also stored in a USI system or an AAA server on the network side. The user notifies the long-lived ID to the application through application-layer interaction with the application, and the application may store a binding relation between the long-lived user ID and a user application identity.

The short-lived user ID is generated and maintained (for example, updated or deleted) by the AAA server or the USI system, and is configured to temporarily replace the long-lived ID to identify a user service, so as to enhance the security of using the service by the user. The short-lived user ID is unique in the NSP. The short-lived user ID may be generated when the user registers with the USI system, or generated after the application implements service interaction with the USI system. The short-lived user ID has a certain lifetime, and the USI system may notify the lifetime of the short-lived user ID to the application, so that the application determines whether the short-lived user ID is valid: that is, the application determines that the short-lived user ID is valid if the short-lived user ID is still within the lifetime. It should be noted that, if the short-lived user ID is generated and maintained by the AAA server, the AAA system needs to notify the short-lived user ID and the lifetime to the USI system, and also needs to notify maintenance operations on the short-lived user ID to the USI system.

Figure 1:
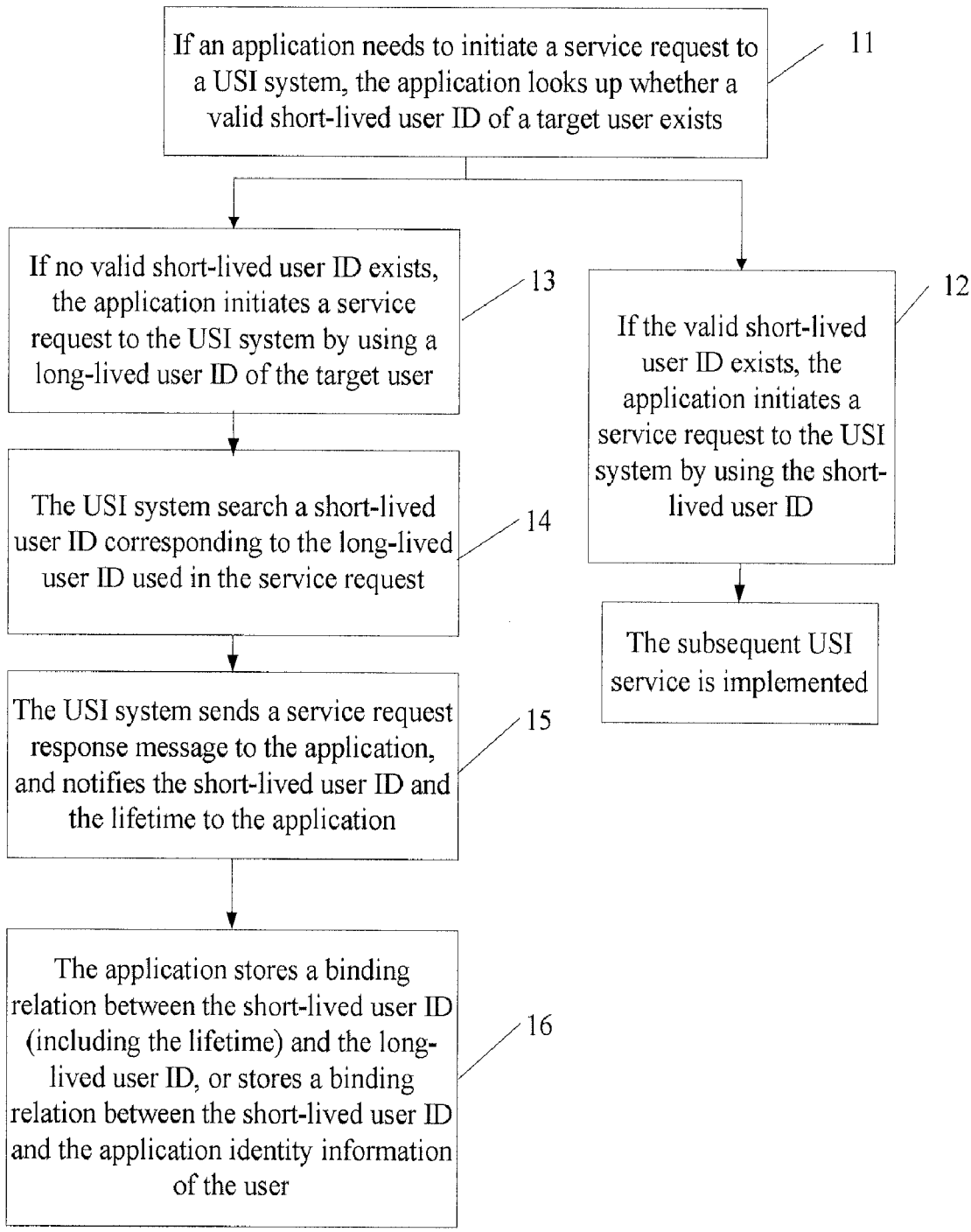
FIG. 1 is a flow chart of a method for invoking a USI by using a long-lived user ID and a short-lived user ID in combination according to an embodiment of the present invention.

A method for invoking a USI by using a long-lived user ID and a short-lived user ID in combination according to an embodiment of the present invention is as described below. As shown in FIG. 1, the short-lived user ID generated and maintained by the USI system is taken as an example, and the method specifically includes the following operations.

Step 11: If an application needs to initiate a service request to a USI system, the application searches for whether a valid short-lived user ID of a target user exists.

Two cases exist when the application needs to initiate a service request to the USI system: one is that the application initiatively initiates a service request to the USI system, and at this time, the user may be in either an online state or an offline state; the other is that the application receives a service request of the user, the service requires interaction with the USI system, and the service request carries information identifying a user application identity.

A method for searching for a valid short-lived user ID of the target user by the application includes: searching for a valid short-lived user ID according to a long-lived user ID of the target user; or searching for a valid short-lived user ID according to application identity information.

It should be noted that, if the application stores a short-lived user ID, the short-lived user ID is bound with a corresponding long-lived user ID, or the short-lived user ID is bound with corresponding application identity information of the user. Therefore, the corresponding short-lived user ID can be found according to the application identity information or the long-lived user ID of the user.

It should be further noted that, before this step, the user already registers with the USI system, and notifies necessary related information (for example, a user/terminal identity, and terminal or network capabilities) to the USI system, and the USI system stores the long-lived user ID, or the USI system obtains the long-lived user ID through a registration process of the USI system.

Step 12: If the valid short-lived user ID exists, the application initiates a service request to the USI system by using the short-lived user ID, and then the subsequent USI service is implemented.

When the valid short-lived user ID exists, it indicates that the application stores the short-lived user ID of the target user, and the short-lived user ID is within the lifetime.

Step 13: If no valid short-lived user ID exists, the application initiates a service request to the USI system by using the long-lived user ID of the target user, and then step 14 is performed.

When no valid short-lived user ID exists, it indicates that the application does not have the short-lived user ID of the target user, or the application stores the short-lived user ID of the target user, but the short-lived user ID already times out.

Step 14: The USI system searches for a short-lived user ID corresponding to the long-lived user ID used in the service request.

If the short-lived user ID corresponding to the long-lived user ID used in the service request exists, the short-lived user ID is notified to the application together with the lifetime of the short-lived user ID.

If no short-lived user ID corresponding to the long-lived user ID used in the service request exists, the USI generates a short-lived user ID corresponding to the long-lived user ID for the user, stores a binding relation between the long-lived user ID and the short-lived user ID, and notifies the short-lived user ID to the application together with the lifetime of the short-lived user ID.

If the short-lived user ID is generated by an AAA server, the USI system may trigger the AAA server to generate a short-lived user ID and lifetime corresponding to the long-lived user ID for the user, the AAA server sends the generated short-lived user ID and lifetime to the USI system, and the USI system stores the binding relation between the long-lived user ID and the short-lived user ID, and notifies the short-lived user ID to the application together with the lifetime; and then step 15 is performed.

In the embodiment of the present invention, the timing when the AAA server or the USI system generates a short-lived user ID for the user is not limited, and the short-lived user ID may be generated after the USI system receives a service request carrying a long-lived user ID, or generated when the user registers with the USI system. If the short-lived user ID is already generated before the service request is received, the USI system searches for the corresponding short-lived user ID according to the received long-lived user ID.

Step 15: The USI system sends a service request response message to the application, and notifies the short-lived user ID and the lifetime to the application; and then step 16 is performed.

The short-lived user ID and the lifetime may be notified to the application through a separate notification message, or notified to the application by carrying the short-lived user ID and the lifetime in the service request response message.

Step 16: The application stores a binding relation between the short-lived user ID and the long-lived user ID, or stores a binding relation between the short-lived user ID and the application identity information of the user. In the subsequent service request, the application uses the short-lived user ID to interact with the USI system within the lifetime of the short-lived user ID.

Figure 2:
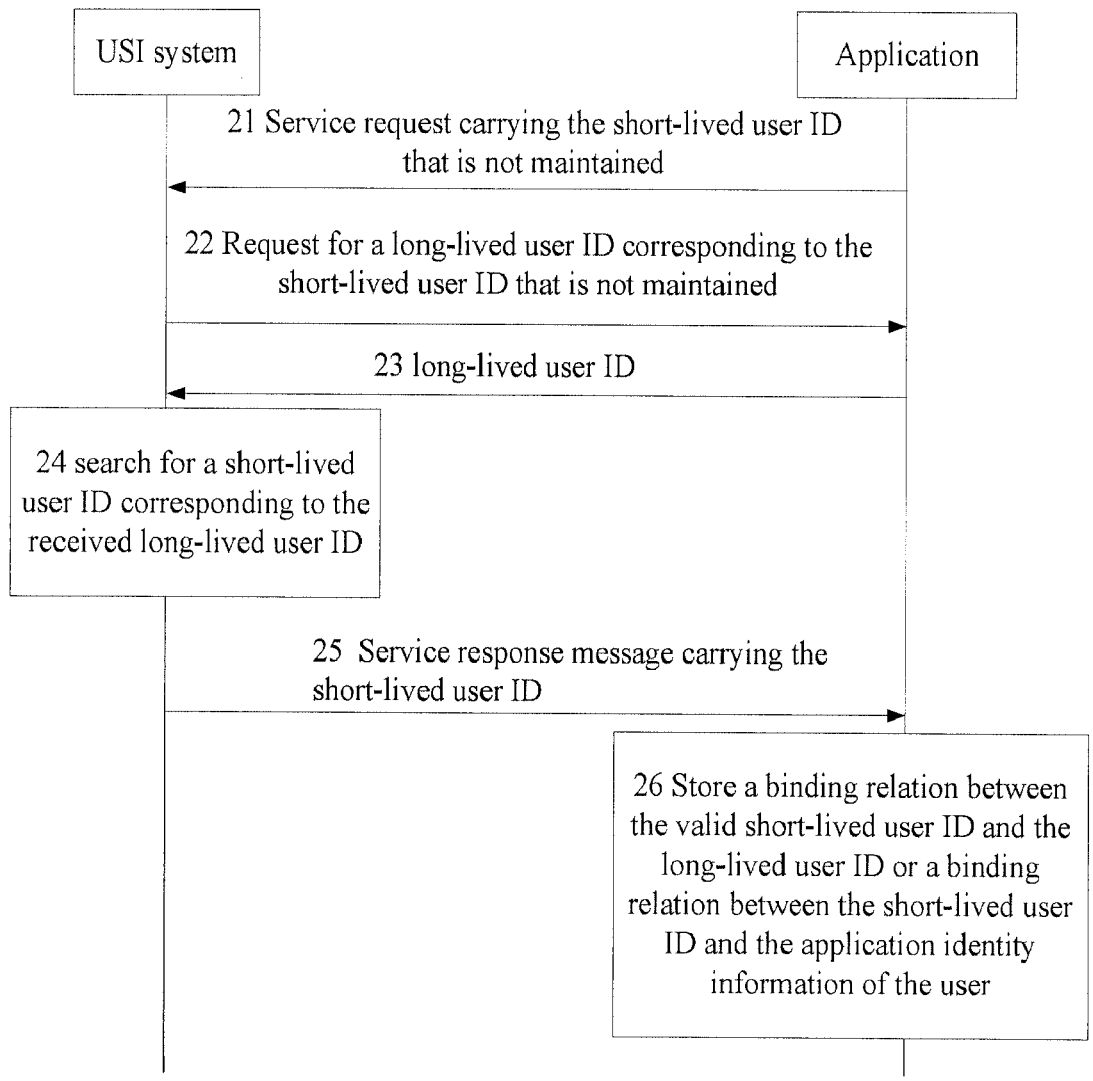
FIG. 2 is a flow chart of invoking a USI after a short-lived user ID is maintained according to an embodiment of the present invention.

If a short-lived user ID stored in the USI system is maintained (for example, updated or deleted) based on maintenance requirements of the short-lived user ID, and the application still uses the short-lived user ID (the ID is invalid at this time), the USI system requests the application for a long-lived user ID corresponding to the short-lived user ID that is not maintained. The application returns the long-lived user ID to the USI system. After receiving the long-lived user ID, the USI system needs to notify the maintained short-lived user ID to the application (in the case that the short-lived user ID is already deleted, the maintained short-lived user ID is a short-lived user ID generated by the USI system after the original short-lived user ID is deleted). As shown in FIG. 2, a specific implementation process includes the following steps.

Step 21: The USI system receives a service request sent by the application carrying the short-lived user ID that is not maintained.

Step 22: The USI system sends a message to the application to request for a long-lived user ID corresponding to the short-lived user ID that is not maintained.

Step 23: The USI system receives the long-lived user ID sent by the application.

Step 24: The USI system searches for a short-lived user ID corresponding to the received long-lived user ID. If no short-lived user ID exists (the short-lived user ID is deleted by the USI system), the USI system generates a short-lived user ID corresponding to the long-lived user ID for the user, and stores a corresponding relation between the short-lived user ID and the long-lived user ID, and then step 25 is performed; alternatively, the USI triggers the AAA server to generate a short-lived user ID and lifetime corresponding to the long-lived user ID for the user, the AAA server sends the short-lived user ID and lifetime to the USI system, and the USI system stores a binding relation between the long-lived user ID and the short-lived user ID, and then step 25 is performed. If the short-lived user ID exists, step 25 is directly performed.

Step 25: The USI system sends a service response message to the application, and notifies the short-lived user ID and the lifetime to the application.

The short-lived user ID may be notified to the application through a separate message, or notified to the application by carrying the short-lived user ID in the service response message.

Step 26: After obtaining the maintained short-lived user ID, the application stores a binding relation between the maintained short-lived user ID and the long-lived user ID or a binding relation between the short-lived user ID and the user application identity. Subsequently, the short-lived user ID is used within the lifetime of the short-lived user ID to implement the USI service.

By using the short-lived user ID and the long-lived user ID in combination, the method according to the embodiment of the present invention effectively ensures the security of USI invocation, and is applicable to the scenario that the application initiatively initiates the USI service request.

Figure 3:
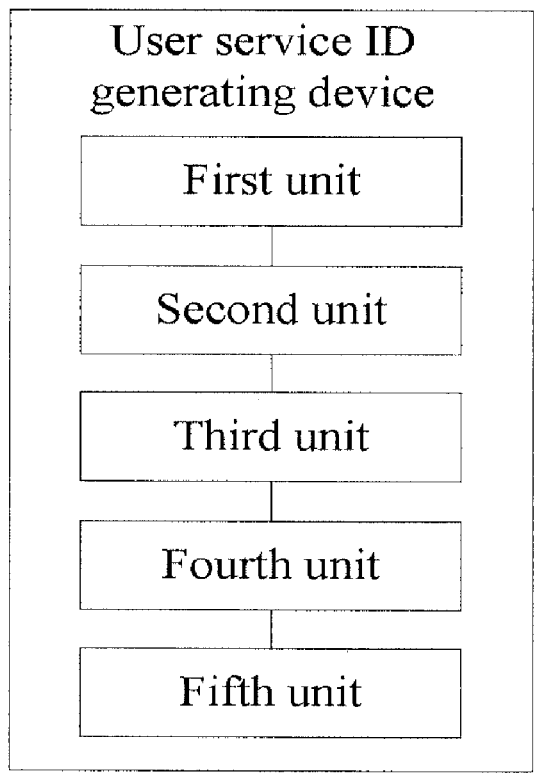
FIG. 3 is a schematic view of modules of a USI system according to an embodiment of the present invention.

In an embodiment, the present invention provides a device for generating a short-lived user ID, which is configured to generate and maintain a short-lived user ID for a user, and store a binding relation between the short-lived user ID and the long-lived user ID. As described above, the long-lived user ID is generated by an NSP for the user. As shown in FIG. 3, the device includes a first unit, a second unit, and a third unit.

The first unit is configured to generate a short-lived user ID for a user, and maintain (for example, update or delete) the short-lived user ID.

The second unit is configured to store a binding relation between the short-lived user ID and a long-lived user ID.

The third unit is configured to search in the second unit for a short-lived user ID, for example, according to the binding relation between the short-lived user ID and the long-lived user ID by using the long-lived user ID as an index.

The device may further include a fourth unit.

The fourth unit is configured to send the short-lived user ID.

In actual applications, the device for generating a short-lived user ID may be disposed on a USI system or an AAA server, and when the device for generating a short-lived user ID is disposed on the USI system, the device for generating a short-lived user ID may further include a fifth unit.

The fifth unit is configured to send a message requesting for a long-lived user ID corresponding to a short-lived user ID that is not maintained after receiving a service request carrying the short-lived user ID that is not maintained.

Figure 4:
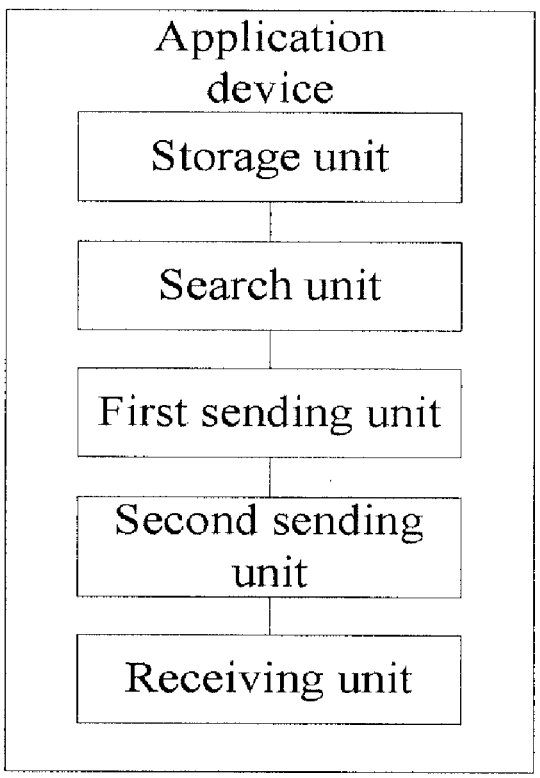
FIG. 4 is a schematic view of modules of an application device according to an embodiment of the present invention.

In an embodiment, the present invention provides an application device, which interacts with a USI system to implement a USI service by using a short-lived user ID. As shown in FIG. 4, the application device includes a storage unit, a search unit, a first sending unit, and a second sending unit.

The storage unit is configured to store a short-lived user ID, a long-lived user ID, application identity information of a user, and binding relations between them.

The search unit is configured to search in the storage unit for a short-lived user ID of a target user, for example, according to the binding relation between the short-lived user ID and the application identity information of the user or the long-lived user ID by using the application identity information of the user or the long-lived user ID as an index.

The first sending unit is configured to send a service request to a USI system by using the short-lived user ID of the target user after the search unit finds the short-lived user ID.

The second sending unit is configured to send a service request to the USI system by using a long-lived user ID after the search unit fails to find the short-lived user ID of the user.

The application device may further include a receiving unit, configured to receive messages, including a service request message sent by the user, a message sent by the USI system requesting for the long-lived user ID, the short-lived user ID sent by the USI system and a service response sent by the USI system.

By using the short-lived user ID and the long-lived user ID in combination, the system according to this embodiment effectively ensures the security of USI invocation, and ensures that the application can actively initiate the USI service request.

Based on the above, by using the short-lived user ID and the long-lived user ID in combination, the present invention makes it difficult to trace services of a specific user and thus effectively ensures the security of USI invocation, supports both the active initiation of a USI service by a user terminal and the initiation of a USI service by the application, and ensures that the application device can initiate the USI service request even when the user is in an offline state. In this way, the problem of limitation on the initiation of a USI service by the application in the prior art is solved.

Person having ordinary skill in the art may understand that all or part of the steps of the method according to the embodiments of the present invention may be implemented by a program instructing relevant hardware. The program may be stored in a computer readable storage medium. When the program runs, the steps of the method according to the embodiments of the present invention are performed:

if an application needs to initiate a service request to a USI system, searching, by the application, for whether a valid short-lived user ID of a target user exists;

if no valid short-lived user ID exists, initiating, by the application, a service request to the USI system by using a long-lived user ID of the target user, and receiving a short-lived user ID and a lifetime sent by the USI system and corresponding to the long-lived user ID used in the service request; and initiating a service request to the USI system by using the short-lived user ID sent by the USI system and corresponding to the long-lived user ID used in the service request; or if the valid short-lived user ID exists, initiating, by the application, a service request to the USI system by using the valid short-lived user ID.

The storage medium may be a Read-Only Memory (ROM), a magnetic disk, or a Compact Disk Read-Only Memory (CD-ROM).

The above descriptions are merely some exemplary embodiments of the present invention, but not intended to limit the scope of the present invention. Any modifications, variations or replacement that can be easily derived by those skilled in the art should fall within the scope of the present invention. Therefore, the protection scope of the present invention is subject to the appended claims.

What is claimed is:

1. A method for invoking a Universal Service Interface (USI), comprising:
when determined that no valid short-lived user identity (ID) of a target user exists in an application for invoking the USI,
initiating, by the application, a service request to a USI system using a long-lived user ID of the target user,
receiving, by the application from the USI system, a short-lived user ID corresponding to the long-lived user ID used in the service request, and
initiating, by the application, a service request to the USI system using the short-lived user ID.

2. The method according to claim 1, further comprising:
if the application needs to initiate a service request to the USI system, searching, by the application, for existence of a valid short-lived user ID of the target user in the application.

3. The method according to claim 2, wherein the searching, by the application, for existence of a valid short-lived user ID of the target user in the application, comprises:
using, by the application, the long-lived user ID of the user as an index to search for a short-lived user ID corresponding to the long-lived user ID according to a binding relation between the long-lived user ID and the short-lived user ID; or
using, by the application, an application identity information of the user as an index to search for a short-lived user ID corresponding to the application identity information according to a binding relation between the application identity information of the user and the short-lived user ID.

4. The method according to claim 1, wherein before the receiving the short-lived user ID, the method further comprises:
searching, by the USI system, for existence of a short-lived user ID corresponding to the long-lived user ID;
sending, by the USI system, the short-lived user ID and a lifetime of the short-lived user ID corresponding to the long-lived user ID to the application.

5. The method according to claim 4, wherein before the sending the short-lived user ID, the method further comprises:
if no valid short-lived user ID corresponding to the long-lived user ID exists in the USI system, generating, by the USI system, the short-lived user ID and the lifetime of the short-lived user ID corresponding to the long-lived user ID.

6. The method according to claim 1, wherein after the receiving the short-lived user ID corresponding to the long-lived user ID used in the service request, the method further comprises:
storing, by the application, the short-lived user ID and a binding relation between the short-lived user ID and the long-lived user ID or a binding relation between the short-lived user ID and application identity information of the user.

7. The method according to claim 1, further comprising:
receiving, by the application, a message sent by the USI system requesting for the long-lived user ID;
sending, by the application, the long-lived user ID to the USI system; and
receiving, by the application from the USI system, a maintained short-lived user ID corresponding to the long-lived user ID.

8. The method according to claim 1, wherein the receiving a short-lived user ID corresponding to the long-lived user ID used in the service request comprises:
receiving, by the application from the USI system, the short-lived user ID and a lifetime of the short-lived user ID corresponding to the long-lived user ID used in the service request.

9. The method according to claim 8, wherein the short-lived user ID and the lifetime are generated and maintained by the USI system.

10. The method according to claim 8, wherein the short-lived user ID and the lifetime of the short-lived user ID are generated and maintained by an Authentication, Authorization and Accounting (AAA) server, and the method further comprises:
   if the short-lived user ID and the lifetime of the short-lived user ID are generated or maintained by the AAA server, receiving, by the USI system, the short-lived user ID and the lifetime of the short-lived user ID from the AAA server.

11. A device for generating a short-lived user identity (ID) disposed for a Universal Service Interface (USI) system, comprising:
   a first unit, configured to generate a short-lived user ID for a user, and maintain the short-lived user ID;
   a second unit, configured to store a binding relation between the short-lived user ID and a long-lived user ID;
   a third unit, configured to search in the second unit for a short-lived user ID corresponding to a long-lived user ID after receiving a service request carrying the long-lived user ID; and
   a fifth unit, configured to send to an application a message requesting for a long-lived user ID corresponding to a short-lived user ID that is not maintained after receiving a service request carrying the short-lived user ID that is not maintained.

12. The device according to claim 11, further comprising:
   a fourth unit, configured to send the short-lived user ID.

13. The device according to claim 11, wherein the device is disposed on an Authentication, Authorization and Accounting (AAA) server.

14. An application device, comprising:
   a storage unit, configured to store a short-lived user ID, a long-lived user ID, application identity information of a user, and binding relations between the short-lived user ID, the long-lived user ID, the application identity information of the user;
   a search unit, configured to search in the storage unit for a short-lived user ID of a target user;
   a first sending unit, configured to send a service request to a Universal Service Interface (USI) system using the short-lived user ID of the target user if the search unit finds the short-lived user ID; and
   a second sending unit, configured to send a service request to the USI system using a long-lived user ID if the search unit fails to find the short-lived user ID of the user.

* * * * *